UNITED STATES PATENT OFFICE.

PHILANDER A. HARRIS AND NICHOLAS MYNDERS, OF PATERSON, NEW JERSEY; SAID MYNDERS ASSIGNOR TO SAID HARRIS.

CLEANSING COMPOUND.

1,264,644.      Specification of Letters Patent.      Patented Apr. 30, 1918.

No Drawing.      Application filed June 14, 1917. Serial No. 174,809.

*To all whom it may concern:*

Be it known that we, PHILANDER A. HARRIS and NICHOLAS MYNDERS, citizens of the United States, residing at Paterson, in the county of Passaic and State of New Jersey, have invented certain new and useful Improvements in Cleansing Compounds, of which the following is a specification.

The object of this invention is to provide a composition for removing oil or grease from pavements, floors and the like surfaces composed of cement, concrete, stone and the like. In the endeavor to produce a composition suitable for this purpose we have had in mind that it should be one capable of accomplishing the cleansing with the very least amount of labor in connection with its application; that it should be inexpensive to manufacture and hence adapted to be marketed at a cost permitting its use, without extravagance, in not merely removing oil or grease from detached parts of but in cleansing entire surfaces, as a whole garage floor or a large expanse of street pavement; that it should be unharmful either to the hands in applying it or to automobile tires or to the floor surface or any other surface, in fact, on which it might become deposited; that its application should not be accompanied by an undesirable flying about of dust; and that there should result as little contrast in appearance as possible between the part of a floor or other surface cleaned by it and the remainder of such surface.

We have found as the result of our effort to meet these conditions that a composition including hydrated lime preferably in the form of an impalpable powder, an inert granular carrier, as clean builders' sand or similar granular material appreciably coarser than the lime, and an inert substance having a greater specific gravity than the lime and in the form of an almost impalpable powder, as certain argillaceous rock—for example, slate—reduced to an almost impalpable powder, is eminently suited for the purposes in hand.

The proportions of the named ingredients we find to be best when they are approximately as follows:

1 part by bulk hydrated lime,
5 parts by bulk of builders' (medium) sand,
$\frac{1}{5}$ part by bulk of slate.

The ingredients, in approximately these proportions, are mixed together thoroughly in the dry state, whereupon they are ready for use.

The functions performed by the several ingredients in the composition are as follows: The hydrated lime obviously serves to "cut" the oil or grease. When the action of the lime on the oil or grease is completed the sand or equivalent inert granular material serves as a carrier for the facile removal of the product of such action on the compound being swept off the treated surface. The slate, in the form of an almost impalpable powder, being of an appreciably greater specific gravity than the powdered lime, is used principally because it is a substance that when thrown about will not of itself rise as a dust and has a specific gravity so much greater than the lime that dust particles of the lime that would otherwise rise when the composition is thrown on the surface and swept about are held down thereby; we do not wish to be limited, in this connection, to slate, as the dust-preventing medium in the composition, since any other material having greater specific gravity than the lime and a fineness of pulverization enabling it effectively to laden down the same, would serve when used in the proper quantity. The slate serves also, however, as a coloring medium; that is to say, whereas the part of a cement or concrete surface cleansed by the composition might otherwise show a cleanness so marked as to present an undesirable contrast with the remainder or untreated part of the surface this material will considerably reduce such contrast in many cases and in some will make it substantially negligible.

The compound contains no water and requires none to promote the cleansing action, but it is used and operated in the perfectly dry state, which of course has the incidental advantage, if properly applied and removed, of leaving the least possible streakings or dirty markings that usually attend the application of water in cleansing cement, concrete and the like surfaces.

The compound acts instantly, it usually being necessary only to sprinkle the surface to be treated with it and lightly sweep it back and forth so that every part of the surface is reached, and immediately remove it, to convert the oily or greasy surface to a condition nearly as free from oil or grease as when newly laid.

We do not wish to be limited to the compound specifically described herein, what we claim being, 1. A dry powder compound for removing oil or grease from surfaces of the kind described including, mixed together, hydrated lime, a granular carrier of coarser material, and a powdered substance of approximately the same relative fineness as, but having greater specific gravity than, the lime.

2. A dry powder compound for removing oil or grease from surfaces of the kind described including, mixed together, powdered hydrated lime, sand, and a powdered substance of approximately the same relative fineness as, but having greater specific gravity than, the lime.

3. A dry powder compound for removing oil or grease from surfaces of the kind described including, mixed together, powdered hydrated lime, sand, and slate powdered to approximately the same relative fineness as the lime.

In testimony whereof we affix our signatures.

PHILANDER A. HARRIS.
NICHOLAS MYNDERS.

Copies of this patent may be obtained for five cents each, by addressing the "Commissioner of Patents, Washington, D. C."